(12) United States Patent
Gross et al.

(10) Patent No.: US 7,281,112 B1
(45) Date of Patent: *Oct. 9, 2007

(54) METHOD FOR STORING LONG-TERM PERFORMANCE DATA IN A COMPUTER SYSTEM WITH FINITE STORAGE SPACE

(75) Inventors: Kenny C. Gross, San Diego, CA (US); Steven K. Heller, Acton, MA (US); Keith A. Whisnant, La Jolla, CA (US); Aleksey M. Urmanov, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 11/069,675

(22) Filed: Feb. 28, 2005

(51) Int. Cl.
*G06F 12/00* (2006.01)
*G06F 7/00* (2006.01)
*G06F 13/12* (2006.01)
*G06T 9/00* (2006.01)

(52) U.S. Cl. ............... 711/170; 345/555; 707/101; 710/68

(58) Field of Classification Search .............. None
See application file for complete search history.

(56) References Cited

U.S. PATENT DOCUMENTS 6,901,582 B1 * 5/2005 Harrison ............... 717/127
6,981,119 B1 * 12/2005 Lepak et al. ........... 711/170
7,188,227 B2 * 3/2007 Luick ................... 711/172

* cited by examiner

*Primary Examiner*—Reginald Bragdon
*Assistant Examiner*—Mehdi Namazi
(74) *Attorney, Agent, or Firm*—Park, Vaughan & Fleming LLP (57) ABSTRACT

One embodiment of the present invention provides a system that systematically monitors and records performance information in a computer system. During operation, the system periodically measures a number of performance parameters in the computer system. The system then stores data representing values for the measured performance parameters in a long-term storage space. Next, the system recurrently compresses data stored in the long-term storage space, thereby allowing additional data representing newly collected performance information to be stored in the long-term storage space.

17 Claims, 7 Drawing Sheets

METHOD FOR STORING LONG-TERM PERFORMANCE DATA IN A COMPUTER SYSTEM WITH FINITE STORAGE SPACE

BACKGROUND

Field of the Invention

The present invention relates to the techniques for performance monitoring in computer systems.

As electronic commerce grows increasingly more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is important to ensure high availability in such enterprise computing systems.

To achieve high availability in computing systems, it is necessary to be able to capture unambiguous diagnostic information that can quickly locate faults in hardware or software. If systems perform too little event monitoring, when problems crop up at a customer site, service engineers may be unable to quickly identify the source of the problem. This can lead to increased down time.

Fortunately, high-end computer servers are now equipped with a large number of sensors that measure physical performance parameters such as temperature, voltage, current, vibration, and acoustics. Software-based monitoring mechanisms also monitor software-related performance parameters, such as processor load, memory and cache usage, system throughput, queue lengths, I/O traffic, and quality of service. Typically, special software analyzes the collected performance data and issues alerts when there is an anomaly. In addition, it is important to archive historical performance data to allow long-term monitoring and to discover slow system degradation.

One challenge in archiving historical performance data is that a computer typically has limited storage space. As time progresses, cumulatively storing real-time performance data will eventually fill up the assigned storage space. One way to resolve this problem is to use a circular file, where the oldest stored performance data is discarded to make room for newly collected data. However, this approach only maintains a historical archive of the last x days. Performance data from more than x days ago is permanently lost. It is therefore difficult to know how a system performed more than x days ago.

SUMMARY

One embodiment of the present invention provides a system that systematically monitors and records performance information in a computer system. During operation, the system periodically measures a number of performance parameters in the computer system. The system then stores data representing values for the measured performance parameters in the long-term storage space. Next, the system recurrently compresses data stored in a long-term storage space, thereby allowing additional data representing newly collected performance information to be stored in the long-term storage space.

In a variation of this embodiment, recurrently compressing the data stored in the long-term storage space involves compressing the stored data when utilization of the long-term storage space exceeds a threshold.

In a variation of this embodiment, compressing the data stored in the long-term storage space involves replacing the existing data points with fewer new data points which preserve certain characteristics of the replaced data points.

In a further variation, replacing the existing data points stored in the long-term storage space with fewer new data points involves: computing an average value for every two successive existing data points stored in the long-term storage space; and replacing every two successive existing data points with a new data point whose value is the average of the two data points being replaced.

In a variation of this embodiment, the system assigns a short-term storage space for storing real-time data carrying performance information of the computer system. The system then periodically consolidates the real-time data stored in the short-term storage space and stores the consolidated real-time data in the long-term storage space.

In a further variation, consolidating the real-time data involves compressing the real-time data with the same compression ratio with which the data stored in the long-term storage space has been compressed.

In a further variation, compressing the real-time data involves replacing every $2^n$ real-time data points with one new data point whose value is the average of the $2^n$ real-time data points, and wherein n is the number of times the data stored in the long-term storage space has been compressed

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), memories, FPGAs (field programmable gate arrays), ASICs (application specific integrated circuits), For example, the transmission medium may include a communications network, such as the Internet.

Performance Monitoring in a Computer System

Figure 1:
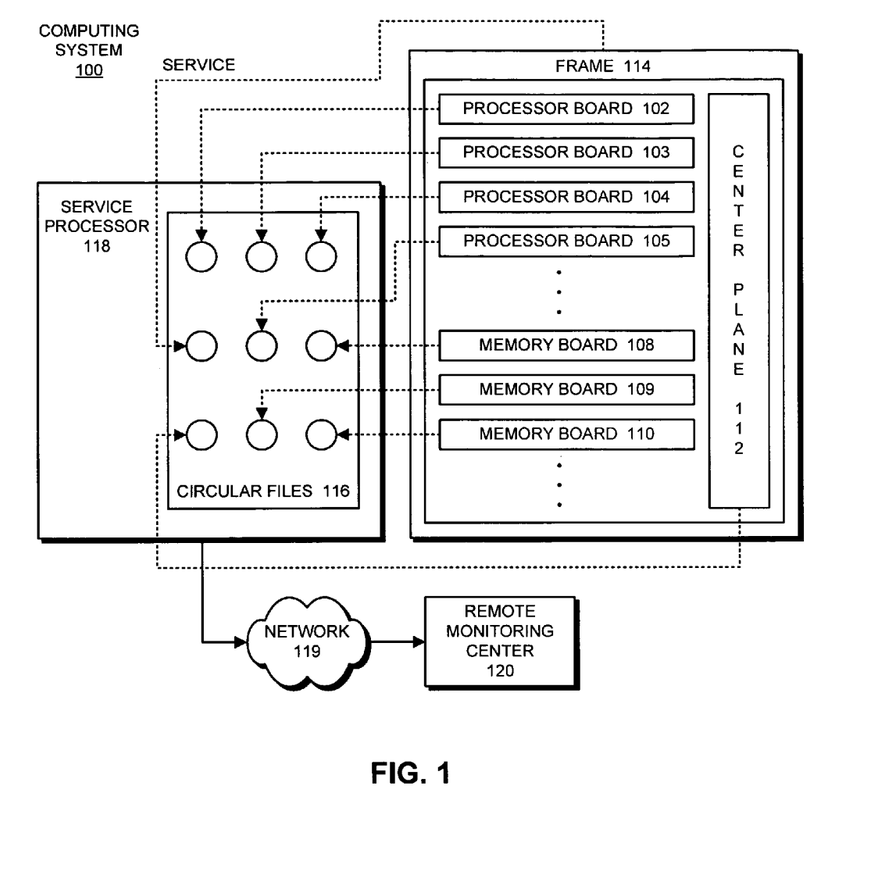
FIG. 1 illustrates a computer system which includes a service processor for processing telemetry signals in accordance with one embodiment of the present invention.

FIG. 1 illustrates a computer system which includes a service processor for processing telemetry signals in accordance with one embodiment of the present invention. As is illustrated in FIG. 1, computer system 100 includes a number of processor boards 102-105 and a number of memory boards 108-110, which communicate with each other through center plane 112. These system components are all housed within a frame 114.

In one embodiment of the present invention, these system components and frame 114 are all field replaceable units (FRUs), which are independently monitored as is described below. Note that all major system units, including both hardware and software, can be decomposed into FRUs. For example, a software FRU can include an operating system, a middleware component, a database, or an application.

Computer system 100 is associated with a service processor 118, which can be located within computer system 100, or alternatively can be located in a standalone unit separate from computer system 100. Service processor 118 performs a number of diagnostic functions for computer system 100. One of these diagnostic functions involves recording performance parameters from the various FRUs within computer system 100 into a set of circular files 116 located within service processor 118. In one embodiment of the present invention, there exists one dedicated circular file for each FRU within computer system 100. Note that this circular file can have a dual-stage structure as is described below with reference to FIG. 2.

Storing Infinite Performance Data with Finite Storage Space

In general, it is desirable to retain the collected performance data. For example, a system can capture the telemetry signals into a "Black Box Flight Recorder" file. This file retains digitized telemetry signals collected in the past and can be useful in diagnosing the cause of failures. One challenge, however, is to provide sufficient storage space for the "Black Box" file, because the "Black Box" file can potentially grow infinitely. One way to cope with this problem is to use a circular file, which retains only the last x days' worth of data. The drawback of using a fixed-size circular file is that one loses the long-term trend behavior of the signals. On the other hand, if one allows the "Black Box" file to grow infinitely, the file may eventually crash the storage system.

To resolve this problem, one embodiment of the present invention adopts a two-tier file system which includes a real-time circular file and a lifetime history file. Both files have finite sizes. The real-time circular file stores real-time performance data for a limited amount of time (e.g., for seven days). When the real-time circular file is full, its data is consolidated and transferred to the lifetime history file. The system recurrently compresses the data stored in the lifetime history file, thereby allowing more data to be stored in the future.

Figure 2:
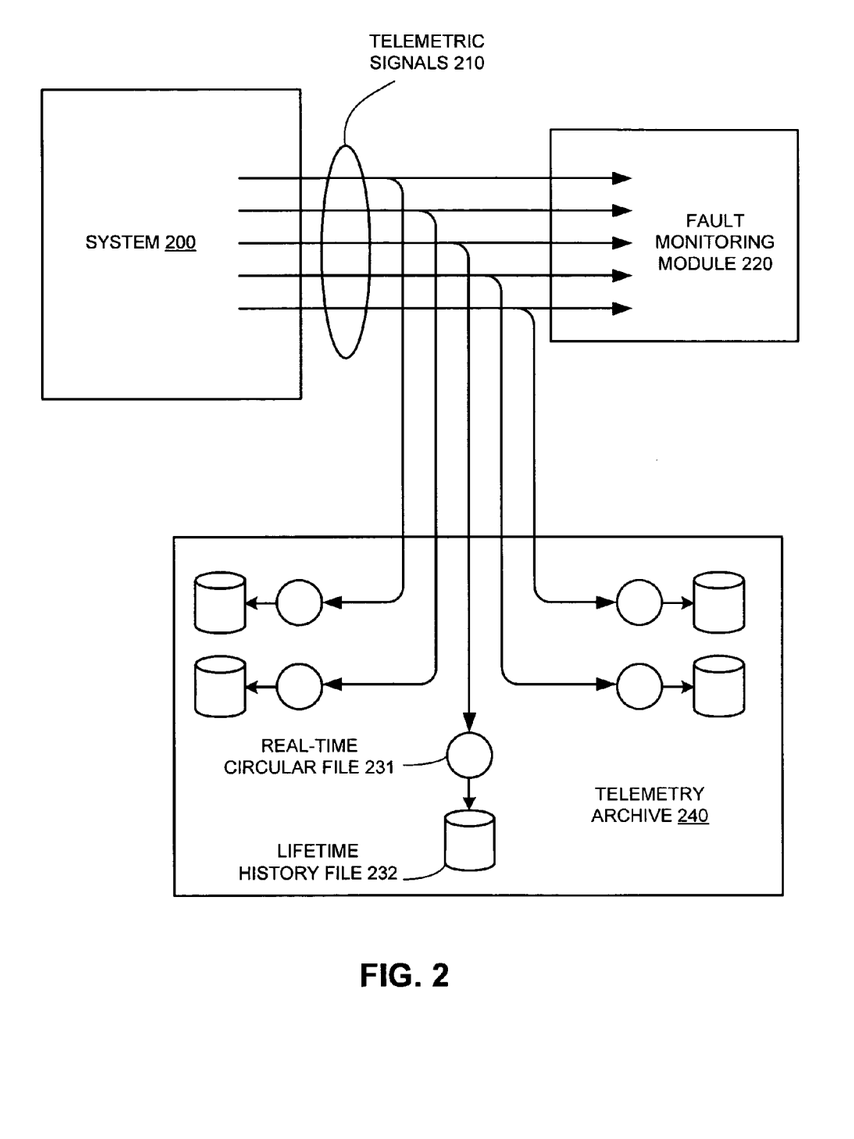
FIG. 2 illustrates a telemetry data archiving system which records both short-term real-time performance data and long-term historical performance data in accordance with an embodiment of the present invention.

FIG. 2 illustrates a telemetry data archiving system which records both short-term real-time performance data and long-term historical performance data in accordance with an embodiment of the present invention. In this example, computer system 200 is monitored with a number of telemetric signals 210, which are transmitted to a fault monitoring module 220. Fault monitoring module 220 analyses telemetric signals 210, and issues alerts when there is an anomaly.

Telemetric signals 210 are also sent to a telemetry archive 240. Within telemetry archive 240, each telemetry signal is recorded in a real-time circular file and subsequently a lifetime history file. As shown in FIG. 2, real-time circular file 231 saves the real-time data of one of the telemetric signals. When real-time circular file 231 is full, its data is consolidated and transferred to lifetime history file 232.

In one embodiment of the present invention, the lifetime history file compresses its data when it is full. One compression method is to compute an ensemble average of every two successive data points, and to replace these two data points with a new data point whose value is the ensemble average thereof. One may use other compression methods, such as discarding every other data point. However, replacing two data points with their average is beneficial because it retains characteristics of the original signal to a certain degree. For example, if there is a very narrow spike in the original signal that lasts for only one sampling interval, discarding every other data point would result in a 50% probability of losing the spike. Conversely, taking ensemble averages of adjacent data pairs can preserve the spike, even if the averaging process can reduce the amplitude of the spike.

Figure 3:
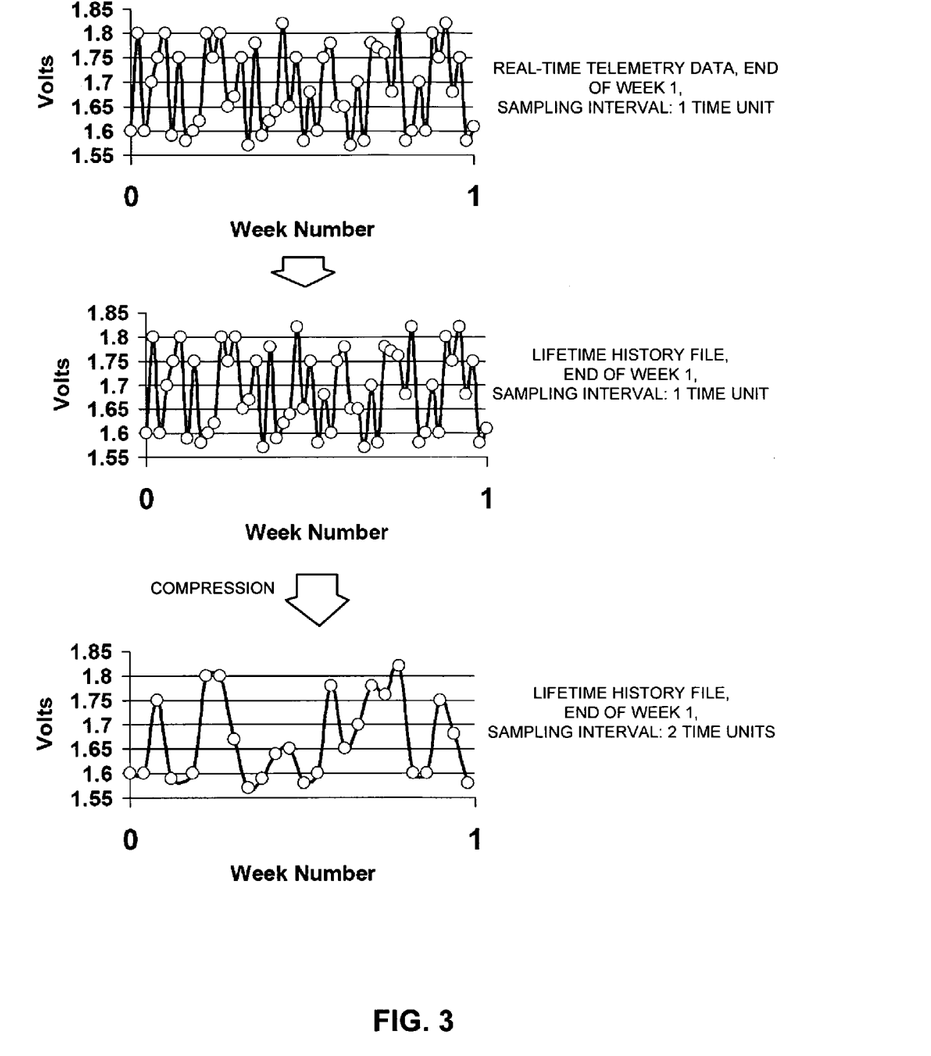
FIG. 3 illustrates an exemplary compression process of the lifetime history file where the final sampling interval is 2 time units in accordance with an embodiment of the present invention.

FIG. 3 illustrates an exemplary compression process of the lifetime history file where the final sampling interval is 2 time units in accordance with an embodiment of the present invention. In this example, the performance parameter under observation is a time series of telemetry data represented in voltage. The real-time circular file is assumed to be able to store one week's worth of real-time performance data. The lifetime historical file is assumed to have the same size as the real-time circular file.

On the top of FIG. 3 are the data points recorded in the real-time circular file at the end of week 1. By the end of week 1, the recorded real-time data has filled up all the space in the real-time circular file. As a result, a data-consolidation process is invoked. The data consolidation process is responsible for compressing the recorded real-time data from the real-time circular file so that the compressed data can be stored in the lifetime history file. However, at the end of week 1, the lifetime history file is empty. Therefore, the data consolidation process does not need to compress the recorded real-time data before transferring the data from the real-time circular file to the lifetime history file. After its data is consolidated and transferred to the lifetime history file, the real-time circular file is ready to record real-time telemetry data for week 2.

In the middle of FIG. 3 are the data points in the lifetime history file after data is transferred from the real-time circular file at the end of week 1. Note that at this moment, the data points in the lifetime history file are identical to those stored in the real-time circular file prior to the transfer. The lifetime history file is currently full, and the sampling interval of its data points is 1 time unit. This is because no compression has occurred yet.

Because the lifetime history file is now full, a data compression process is triggered. This compression process compresses the data points currently stored in the lifetime history file, so that more storage space within the file is available for storing future data points consolidated and transferred from the real-time circular file. The compression process replaces every two neighboring data points with a new data point whose value is the ensemble average of the two replaced data points.

Shown at the bottom of FIG. 3 are the data points in the lifetime history file after the compression process. The resulting data in the lifetime history file is one week's worth of ensemble averages for week 1. The sampling interval is now 2 time units. Correspondingly, the number of data points is reduced by 50%, and the lifetime history file is 50% full.

Figure 4:
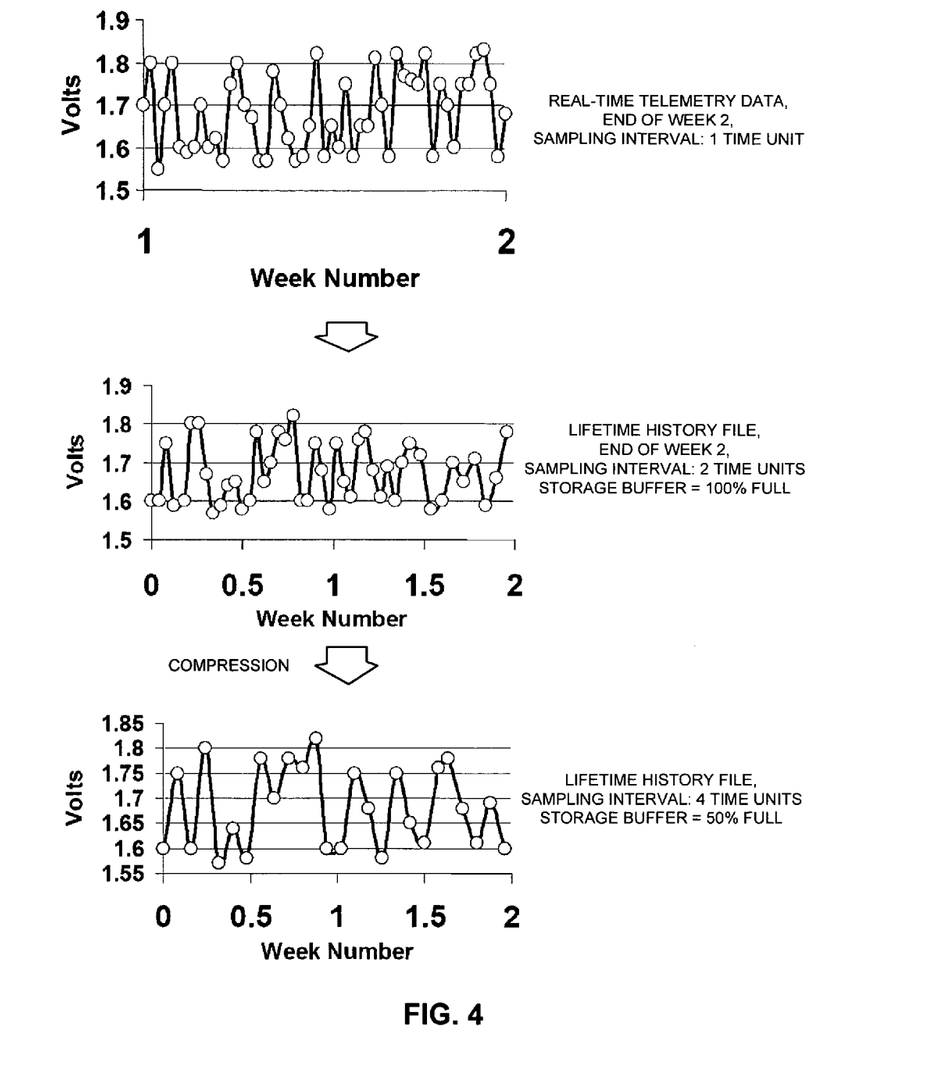
FIG. 4 illustrates an exemplary compression process of the lifetime history file where the final sampling interval is 4 time units in accordance with an embodiment of the present invention.

FIG. 4 illustrates an exemplary compression process of the lifetime history file where the final sampling interval is 4 time units in accordance with an embodiment of the present invention. Subsequent to data compression process at the end of week 1 as shown in FIG. 3, the real-time circular file continues collecting real-time telemetry data into week 2. FIG. 4 illustrates the state of the real-time circular file and the lifetime history file at the end of week 2.

On the top of FIG. 4 are the data points recorded in the real-time circular file at the end of week 2. By the end of week 2, the recorded real-time data has again filled up all the space in the real-time circular file. Consequently, the data-consolidation process is invoked. The lifetime history file now contains compressed historical data from week 1. Therefore, the data consolidation process compresses the recorded real-time data before transferring the data from the real-time circular file to the lifetime history file.

During the consolidation process, the compression ratio ideally matches the compression ratio of the historical data stored in the lifetime history file. In this example, the historical data has undergone one compression process and hence has a compression ratio of 2 to 1 with respect to the uncompressed real-time data. Therefore, the consolidation process replaces every two data points in the real-time circular file with a new data point whose value is the ensemble average of the two original data points. Note that if the compression ratio is 4 to 1, the consolidation process would replace four real-time data points with a new ensemble-average data point. After its data is consolidated and transferred to the lifetime history file, the real-time circular file clears its storage space and is ready to record real-time telemetry data for week 3.

In the middle of FIG. 4 are the data points in the lifetime history file after real-time data is consolidated and transferred from the real-time circular file at the end of week 2. The lifetime history file is once again 100% full with two week's worth of historical data, and the sampling interval of its data points is 2 time units.

Because the lifetime history file is full, the data compression process is triggered. The compression process again replaces every two neighboring data points with a new data point whose value is the ensemble average of the two replaced data points. Shown at the bottom of FIG. 4 are the data points in the lifetime history file after the compression process. The resulting data in the lifetime history file is two weeks' worth of ensemble averages for weeks 1 and 2. The sampling interval is now 4 time units and the lifetime history file is 50% full.

Note that the above described consolidation process for the real-time circular file occurs at the end of every week, because the real-time circular file becomes full once a week. The compression process for the lifetime history file is triggered when the file is full. Hence, the compression process occurs at the end of week 1, 2, 4, ..., $2^n$, where n is the number of compressions performed on the historical data. n also determines the compression ratio of the consolidation process, which is $2^n$ to 1.

Figure 5:
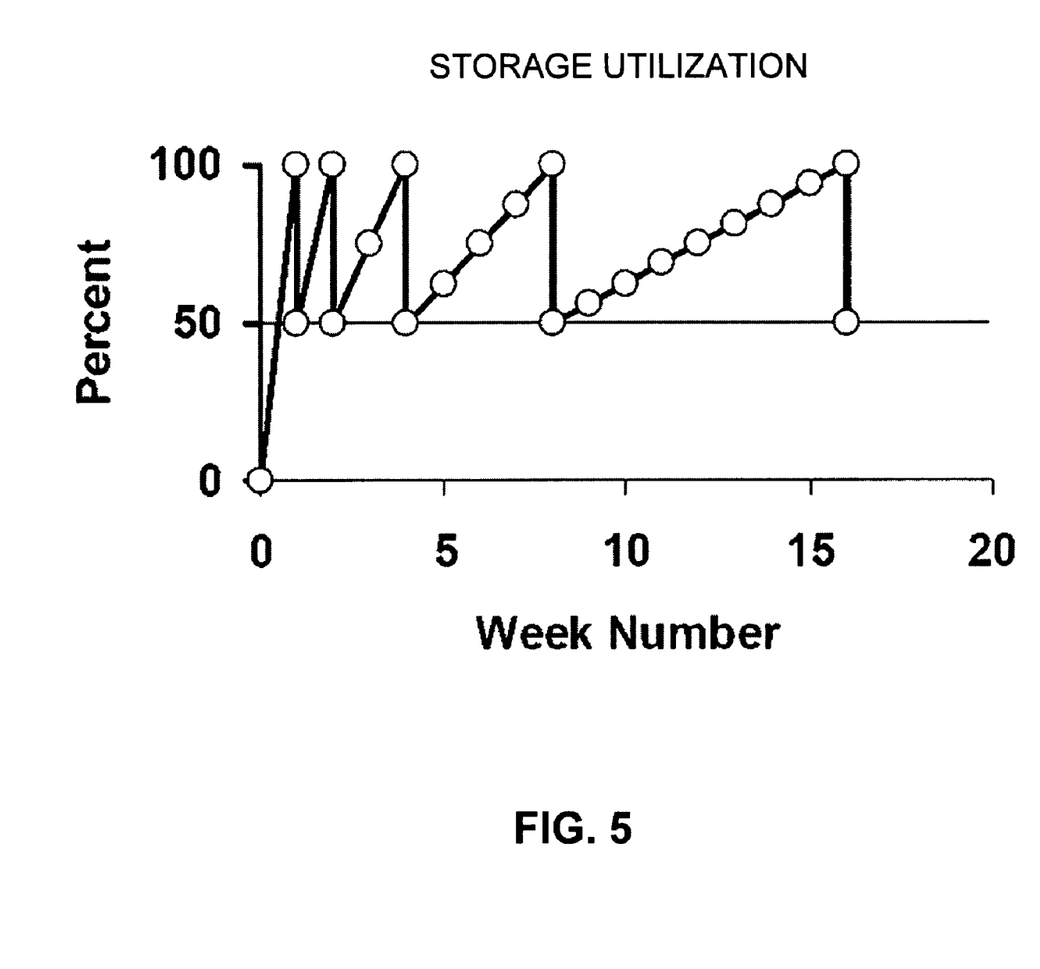
FIG. 5 illustrates the storage utilization of the lifetime history file in accordance with one embodiment of the present invention.

With the consolidation and compression process, the lifetime history file may continuously store historical data with limited storage space. FIG. 5 illustrates the storage utilization of the lifetime history file in accordance with one embodiment of the present invention. At the end of week 1, the lifetime history file is full. The compression process is triggered for the first time and reduces the storage utilization of the lifetime history file to 50%. At the end of week 2, the file is full again with 2 time-unit ensemble average data points. The compression process is triggered and reduces the storage utilization back to 50%. This process may continue for a long time. The resulting average of the storage utility is 75%.

Figure 6:
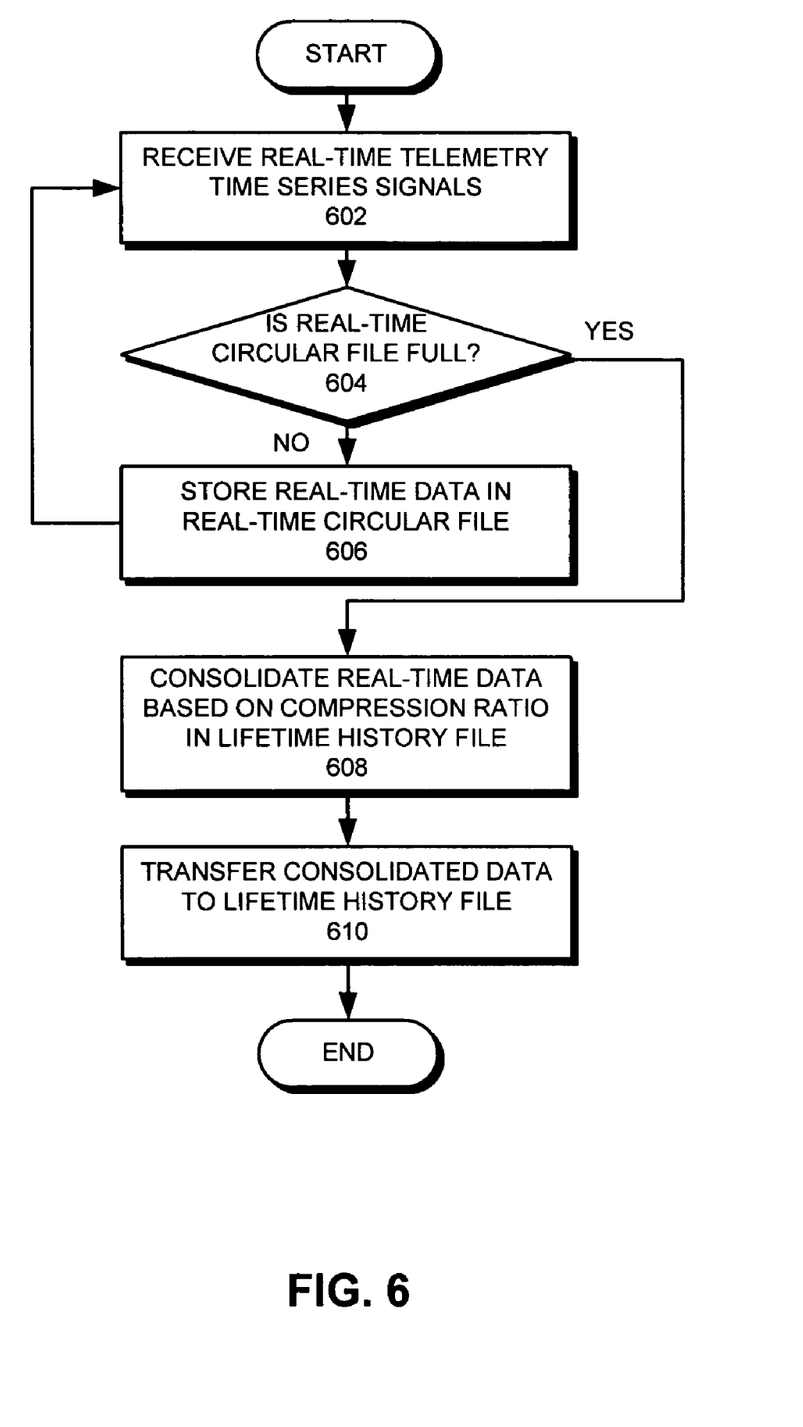
FIG. 6 presents a flow chart illustrating the process of consolidating recorded real-time performance data when a real-time circular file is full in accordance with an embodiment of the present invention.

FIG. 6 presents a flow chart illustrating the process of consolidating recorded real-time performance data when a real-time circular file is full in accordance with an embodiment of the present invention. During operation, the system receives real-time telemetry time series signals (step 602). The system then determines whether the real-time circular time is full (step 604). If it is not full, the system stores the received data in the real-time circular file (step 606) and continues to collect additional real-time data (step 602).

If the real-time circular file is full, the system consolidates the real-time data based on the compression ratio of the historical data in the lifetime history file (step 608). The system then transfers the consolidated data to the lifetime history file (step 610)

Figure 7:
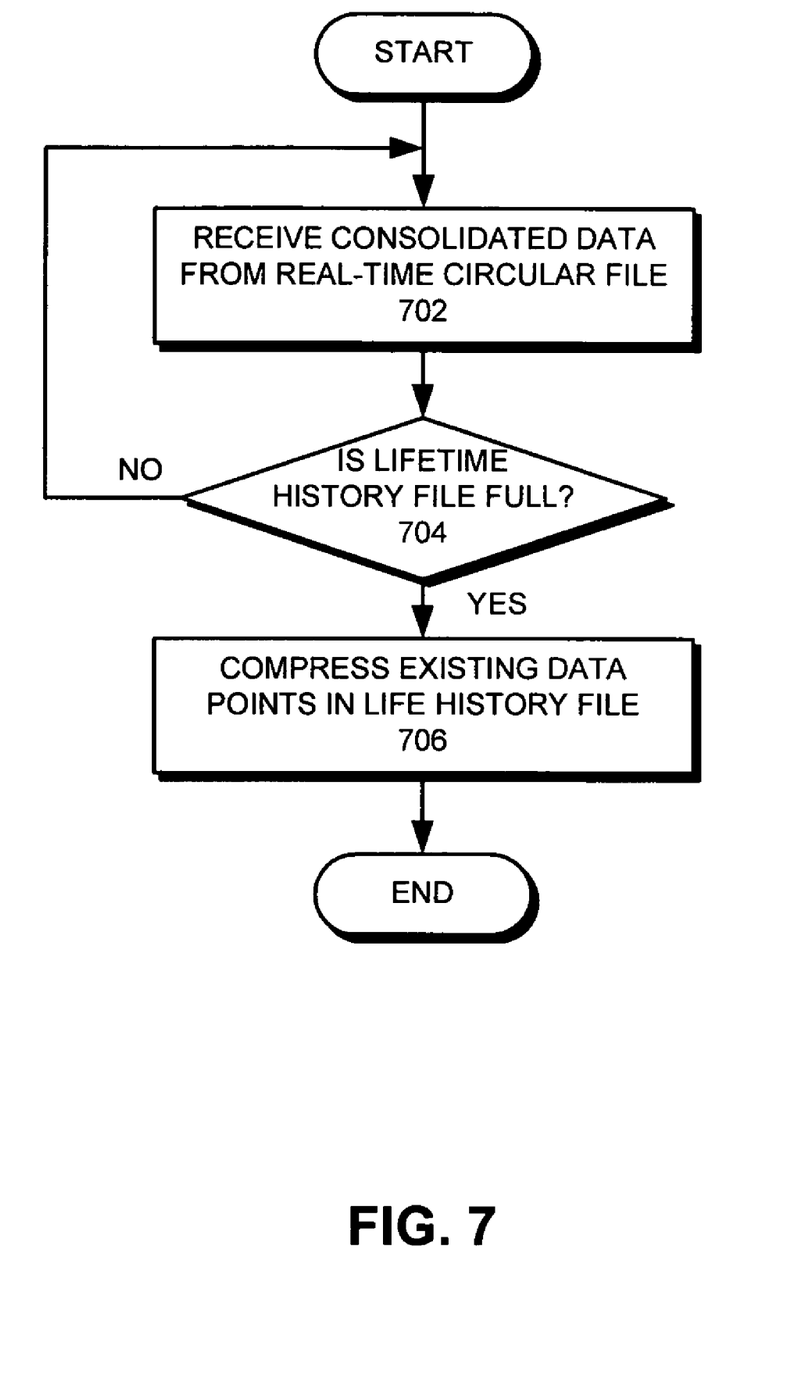
FIG. 7 presents a flow chart illustrating the process of compressing data in a lifetime history file in accordance with an embodiment of the present invention.

FIG. 7 presents a flow chart illustrating the process of compressing data in a lifetime history file in accordance with an embodiment of the present invention. During operation, the system receives the consolidated data from the real-time circular file (step 702). The system then determines whether the lifetime history file is full (step 704). If it is not full, the system prepares to receive additional consolidated data from the real-time circular file (step 702). If the lifetime history file is full, the system compresses the existing historical data points in the life history file (step 706).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for systematically monitoring and recording performance information in a computer system, comprising:
    periodically measuring a number of performance parameters in the computer system;
    storing data representing values for the measured performance parameters in a long-term storage space;
    recurrently compressing data stored in the long-term storage space, thereby allowing additional data representing newly collected performance information to be stored in the long-term storage space;
    assigning a short-term storage space for storing real-time data carrying performance information of the computer system; and periodically consolidating the real-time data stored in the short-term storage space and storing the consolidated real-time data in the long-term storage space.

2. The method of claim 1, wherein recurrently compressing the data stored in the long-term storage space involves compressing the stored data when utilization of the long-term storage space exceeds a threshold.

3. The method of claim 1, wherein compressing the data stored in the long-term storage space involves replacing a set of existing data points with fewer new data points which preserve certain characteristics of the replaced data points.

4. The method of claim 3, wherein replacing the existing data points stored in the long-term storage space with fewer new data points involves:
computing an average value for every two successive existing data points stored in the long-term storage space; and
replacing every two successive existing data points with a new data point whose value is the average of the two data points being replaced.

5. The method of claim 1, wherein consolidating the real-time data involves compressing the real-time data with the same compression ratio with which the data stored in the long-term storage space has been compressed.

6. The method of claim 5, wherein compressing the real-time data involves replacing every $2^n$ real-time data points with one new data point whose value is the average of the $2^n$ real-time data points, and wherein n is the number of times the data stored in the long-term storage space has been compressed.

7. A computer-readable storage medium storing instructions that when executed by a computer cause the computer to perform a method for systematically monitoring and recording performance information in a computer system, the method comprising:
periodically measuring a number of performance parameters in the computer system;
storing data representing values for the measured performance parameters in a long-term storage space;
recurrently compressing data stored in the long-term storage space, thereby allowing additional data representing newly collected performance information to be stored in the long-term storage space;
assigning a short-term storage space for storing real-time data carrying performance information of the computer system; and
periodically consolidating the real-time data stored in the short-term storage space and storing the consolidated real-time data in the long-term storage space.

8. The computer-readable storage medium of claim 7, wherein recurrently compressing the data stored in the long-term storage space involves compressing the stored data when utilization of the long-term storage space exceeds a threshold.

9. The computer-readable storage medium of claim 7, wherein compressing the data stored in the long-term storage space involves replacing a set of existing data points with fewer new data points which preserve certain characteristics of the replaced data points.

10. The computer-readable storage medium of claim 9, wherein replacing the existing data points stored in the long-term storage space with fewer new data points involves:
computing an average value for every two successive existing data points stored in the long-term storage space; and
replacing every two successive existing data points with a new data point whose value is the average of the two data points being replaced.

11. The computer-readable storage medium of claim 7, wherein consolidating the real-time data involves compressing the real-time data with the same compression ratio with which the data stored in the long-term storage space has been compressed.

12. The computer-readable storage medium of claim 11, wherein compressing the real-time data involves replacing every $2^n$ real-time data points with one new data point whose value is the average of the $2^n$ real-time data points, and wherein n is the number of times the data stored in the long-term storage space has been compressed.

13. An apparatus for systematically monitoring and recording performance information in a computer system, comprising:
a monitoring mechanism configured to periodically monitor a number of performance parameters in the computer system;
a data storage mechanism configured to store data representing values for the measured performance parameters in a long-term storage space, further comprising a short-term storage space for storing real-time data carrying performance information of the computer system; and
a compression mechanism configured to recurrently compress data stored in the long-term storage space, thereby allowing additional data representing newly collected performance information to be stored in the long-term storage space.

14. The apparatus of claim 13, wherein while recurrently compressing the data stored in the long-term storage space, the compression mechanism is configured to compress the stored data when utilization of the long-term storage space exceeds a threshold.

15. The apparatus of claim 13, wherein while compressing the data stored in the long-term storage space, the compression mechanism is configured to replace a set of existing data points with fewer new data points which preserve certain characteristics of the replaced data points.

16. The apparatus of claim 15, wherein while replacing the existing data points stored in the long-term storage space with fewer new data points, the compression mechanism is configured to:
compute an average value for every two successive existing data points stored in the long-term storage space; and
to replace every two successive existing data points with a new data point whose value is the average of the two data points being replaced.

17. The apparatus of claim 13, wherein while consolidating the real-time data, the consolidation mechanism is configured to compress the real-time data with the same compression ratio with which the data stored in the long-term storage space has been compressed.

* * * * *